(12) United States Patent
Perry et al.

(10) Patent No.: US 6,260,821 B1
(45) Date of Patent: Jul. 17, 2001

(54) ON/OFF VALVE FOR A PAINTBALL GUN

(75) Inventors: Rod Perry, Greenburg; William Gardner, Jr., Lingonier Township, both of PA (US)

(73) Assignee: SmartParts, Inc., Latrobe, PA (US)

( * ) Notice: Subject to any disclaimer, the term of this patent is extended or adjusted under 35 U.S.C. 154(b) by 0 days.

(21) Appl. No.: 09/541,776

(22) Filed: Apr. 3, 2000

(51) Int. Cl.$^7$ ........................................ F16K 5/04
(52) U.S. Cl. ............................ 251/314; 251/309
(58) Field of Search ..................... 251/214, 309, 251/314

(56) References Cited

U.S. PATENT DOCUMENTS

| | | | | |
|---|---|---|---|---|
| 4,010,930 | * | 3/1977 | Sands ..................................... | 251/314 |
| 4,880,032 | * | 11/1989 | Doutt ................................. | 251/314 X |
| 5,037,067 | * | 8/1991 | Ray ...................................... | 251/314 |
| 5,791,328 | * | 8/1998 | Alexander ........................ | 251/321 X |
| 5,957,119 | * | 9/1999 | Perry et al. .................... | 137/68.23 X |

* cited by examiner

*Primary Examiner*—Kevin Lee
(74) *Attorney, Agent, or Firm*—Marger Johnson & McCollom, P.C.

(57) ABSTRACT

An on/off valve for a paintball gun comprises a valve body. The valve body includes a gas inlet to receive a gas from a compressed gas source and a gas outlet to transmit the gas to the paintball gun The valve body also contains a plug cavity for receivingly engaging a plug. The plug includes a flow aperture for transmitting the gas from the inlet aperture to the outlet aperture. An actuator controls the plug position and, hence, a supply of gas through the flow aperture. An o-ring is seated within an exit port of the gas inlet in contact with the valve body and the plug. In operation, the gas has a pressure that exerts a force on the o-ring to maintain it in a sealing engagement with the plug. Movement of the actuator between an "oi" position and an "off" position opens and closes the on/off valve. In an open position, the flow aperture is positioned in communication with the inlet aperture and permits a flow of gas from the inlet aperture to the outlet aperture. Conversely, in a closed position, gas flow between the gas inlet and the gas outlet is prevented. Rotation of the plug does not substantially move the o-ring relative to the valve body.

20 Claims, 14 Drawing Sheets

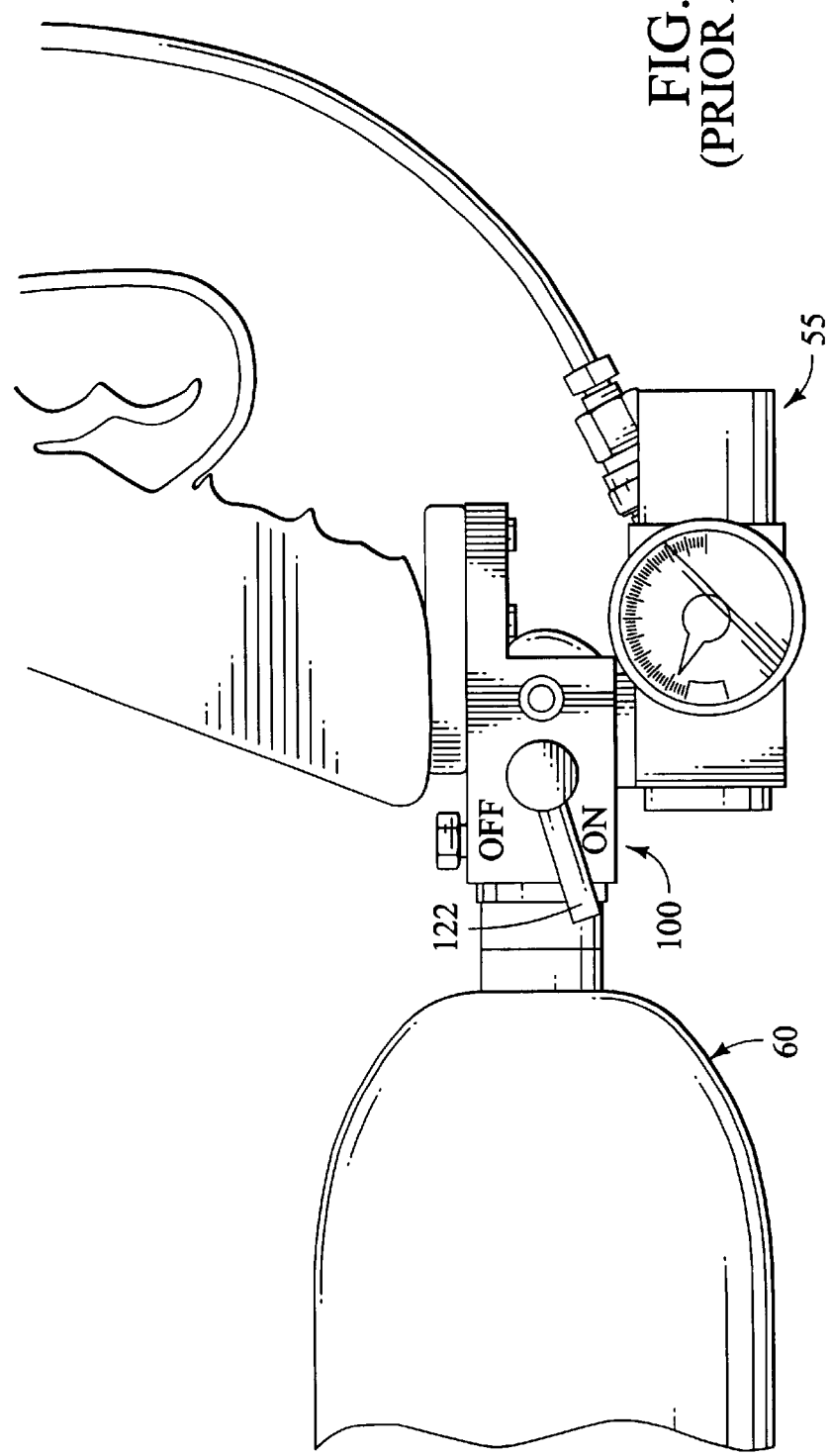

ON/OFF VALVE FOR A PAINTBALL GUN

BACKGROUND OF THE INVENTION

This invention relates generally to paintball guns. More specifically, this invention relates to a paintball gun on/off valve for selectively controlling a supply of gas from a compressed gas source.

The industry has been unable to provide a reliable on/off valve for selectively supplying a flow of compressed $CO_2$ gas to a paintball gun from a $CO_2$ gas source. In particular, on/off valves of the prior art have problems, such as leakage of the $CO_2$, and are therefore unreliable.

FIG. 1 is a perspective view of a paintball gun 50 having an on/off valve 100 according to the prior art. FIG. 2 is an enlarged side elevation view of the on/off valve 100 of FIG. 1, showing the external attachment between a pressure regulator 55 of a paintball gun 50 and a compressed gas source 60. The on/off valve 100 of FIGS. 1 and 2 is typical for guns using compressed air or nitrogen as the compressed gas source 60. FIG. 2A is a side elevation view of an on/off valve 100A, similar to the valve 100 shown in FIGS. 1 and 2. The compressed gas source 60A, used with the valve 100A, is $CO_2$. FIG. 3 is a bottom right side perspective view of the prior art on/off valve 100A of FIG. 2A, shown independent of attachment to external components. The only structural differences between the valve 100 shown in FIGS. 1 and 2 and the valve 100A of FIGS. 2A and 3 are the type of actuator 122 used and the size of the valve. FIGS. 1 and 2 show a lever-type actuator 122 on a larger valve for use with a compressed air or nitrogen gas source 60, while FIG. 3 shows a knob-type actuator 122A for use with a compressed $CO_2$ gas source 60A.

The internal configuration of the conventional on/off valves 100, 100A is shown in FIGS. 4–7. Specifically, FIG. 4 is a horizontally cross-sectioned bottom plan view of the prior art on/off valve 100A, shown in FIG. 3. FIG. 5 is an enlarged, vertically cross-sectioned, partial right side elevation view of the prior art on/off valve 100A of FIG. 3. FIG. 6 is a front elevation view and a cutaway left side elevation view of a plug 120 for use in the prior art on/off valve 100A of FIG. 3. FIG. 7 is a horizontally cross-sectioned bottom plan view and a vertically cross-sectioned front elevation view of a valve body 102 for use in the prior art on/off valve 100A of FIG. 3. The general internal configuration of the valve 100 is the same as that for valve 100A, except with respect to the sizing of the components.

Referring to FIGS. 4–7, the prior art on/off valve 100A has a valve body 102 with a gas inlet 110 and a gas outlet 112 extending longitudinally through the body 102. The valve body 102 also includes a plug cavity 115 that extends laterally through the body 102 between the inlet 110 and the outlet 112 from a right side (top of FIG. 4) to a left side (bottom of FIG. 4) of the body 102. A plug 120 is positioned within the plug cavity 115. The plug includes a knob (or other actuator) 122A that can be rotated 90° to switch the valve 100A on or off. The actuator 122A is attached to a plug stem 124 that extends into and through the plug cavity 115. A flow aperture 125 is provided through the plug stem 124, and is located at the lateral position of the inlet 110 and the outlet 112, when the plug stem 124 is properly arranged inside the cavity 115.

Two o-rings 126, 126A extend around the plug stem 124 within grooves 127, 127A on opposite lateral sides of the inlet 110 and outlet 112. These o-rings 126, 126A provide a seal between the plug stem 124 and the wall of the cavity 115 to prevent the gas from leaking out through the plug ends and to ensure that the gas from the gas inlet 110 travels to the gas outlet 112 when the valve 100A is open. A third o-ring 128 is provided along the external surface of the plug stem 124 within a circular-shaped groove 129. The third o-ring 128 is designed to prevent gas from leaking into the outlet 112 and, hence, from flowing to the gun 50, when the actuator 122A is in an "off" (closed valve) position. Specifically, when the actuator 122A is located in an "off" position, the o-ring 128 surrounds an entry port 113 of the outlet 112, preventing the gas from entering the outlet 112. It should be noted that the third o-ring 128 only performs its sealing function when the valve is in the "off" position.

Referring to FIGS. 1–7, the operation of the prior art on/off valves 100, 100A is as follows. When the actuator 122, 122A is located in an "on" (open valve) position, the flow aperture 125 in the plug stem 124 is arranged in communication with both the inlet 110 and the outlet 112 in order to permit the gas to flow from the inlet 110 to the outlet 112. When the actuator 122, 122A is rotated 90° from the open position into a closed position, the third o-ring 128 slides into place around the entry port 113 of the outlet 112, and the flow aperture 125 is positioned transverse to an axis running from the inlet 110 to the outlet 112. This prior art system works fairly well for compressed air and Nitrogen systems which have larger valve sizes.

Unfortunately, however, this configuration has several disadvantages when used for $CO_2$ systems, which generally have smaller valves. In particular, the wall of the plug cavity 115 is very difficult to debur, particularly around the entry port 113 of the outlet 112. This is because the cavity 115 and port 113 are located inside the valve body 102. Inevitably, therefore, small, sharp protrusions are left on the wall surface of the cavity 115. These protrusions tend to cut or slice the o-ring 128 as the plug 120 is rotated from the open to the closed position. Specifically, burs around the entry port 113 of the outlet 112 tend to slice the o-ring 128 as it slides past to reach the closed position. Once the o-ring 128 has been cut, it can no longer provide an adequate sealing function and gas will leak into the outlet 112 even when the valve 100A is closed.

In addition, the o-ring 128 of the prior art valve 100A is relatively large and pliable, e.g., a 007–70° Urethane (U) or Ethylene Propylene (EP) o-ring. With this o-ring 128, when $CO_2$ is used as the compressed gas, the o-ring 128 has a tendency to absorb the $CO_2$ and expand as a result. Also, because the o-ring 128 is fairly large in proportion to the diameter of the plug 120, it tends to come out of its groove 129. Furthermore, pressure from the gas source tends to force the o-ring 128 into contact with the valve body 102. The expansion forces and gas pressure increase the contact between the o-ring 128 and the body 102, thereby increasing the likelihood that surface irregularities along the cavity walls (and particularly around the entry port 113 of the outlet 112) will destroy the o-ring 128. When the o-ring 128 is destroyed, the compressed gas begins to leak from the on/off valve 100A, shortening the life of the gas source. Because of this, the prior art on/off valve 100A is unreliable.

SUMMARY OF THE INVENTION

An object of the present invention is to enable a reliable on/off valve for a paintball gun.

This invention provides a significant improvement in the art by enabling an on/off valve for a paintball gun with improved reliability over the prior art. Specifically, an on/off valve for a paintball gun according to this invention comprises a valve body that has a plurality of gas apertures. The gas apertures include a gas inlet configured to receive a gas from a pressurized gas source, and a gas outlet configured to transmit the gas to a paintball gun. An actuator is configured to selectively control a flow of the gas from the gas inlet to the gas outlet. A seal is located inside a port of one or more of the apertures to prevent the gas from leaking.

In operation, the valve is switched between an open ("on") position and a closed ("off") position by actuation of the actuator. In an open position, the flow of gas is permitted between the gas inlet and the gas outlet. In a closed position, the flow of gas is interrupted. The seal operates to prevent gas from leaking from the port in which it is located. The seal performs its sealing function when valve is in its open position as well as when it is in its closed position.

A method of constructing an on/off valve for a paintball gun is also provided. According to this method, a valve body is provided that includes a gas inlet configured to receive a gas from a compressed gas source, and a gas outlet configured to supply the gas to a paintball gun. An actuator is also provided to selectively connect the gas inlet in fluid communication with the gas outlet Finally, a seal is arranged within an exit port of the inlet aperture to prevent leakage of the pressurized gas from the exit port.

The foregoing and other objects, features and advantages of the invention will become more readily apparent from the following detailed description of a preferred embodiment of the invention which proceeds with reference to the accompanying drawings.

BRIEF DESCRIRIPON OF THE DRAWINGS

FIG. 2 is an enlarged side view of the on/off valve of FIG. 1.

DETAILED DESCRITION

Figure 1:
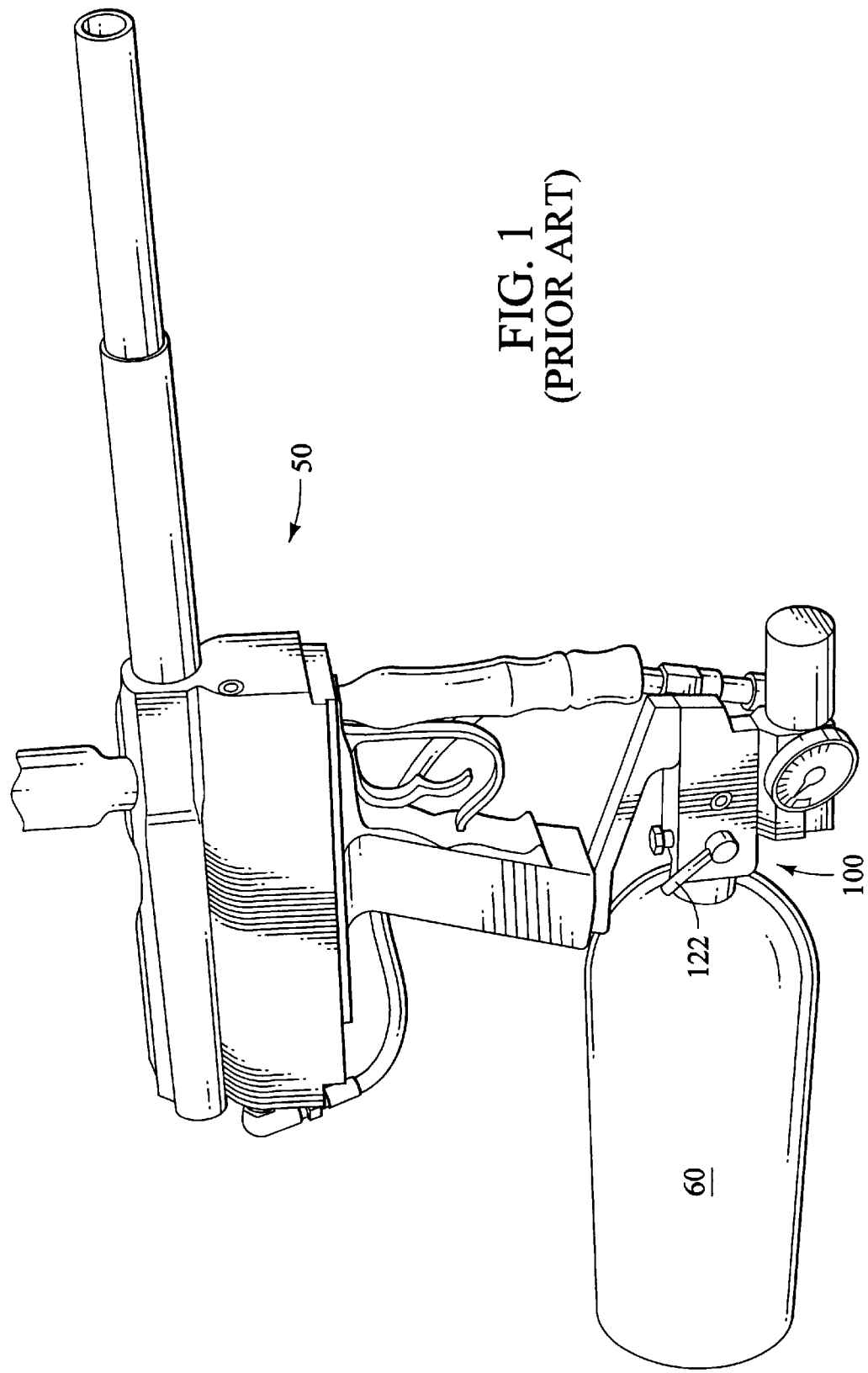
FIG. 1 is a front, right side perspective view of a paintball gun with a compressed gas source, showing the general location of an on/off valve according to the prior art.
Figure 2A:
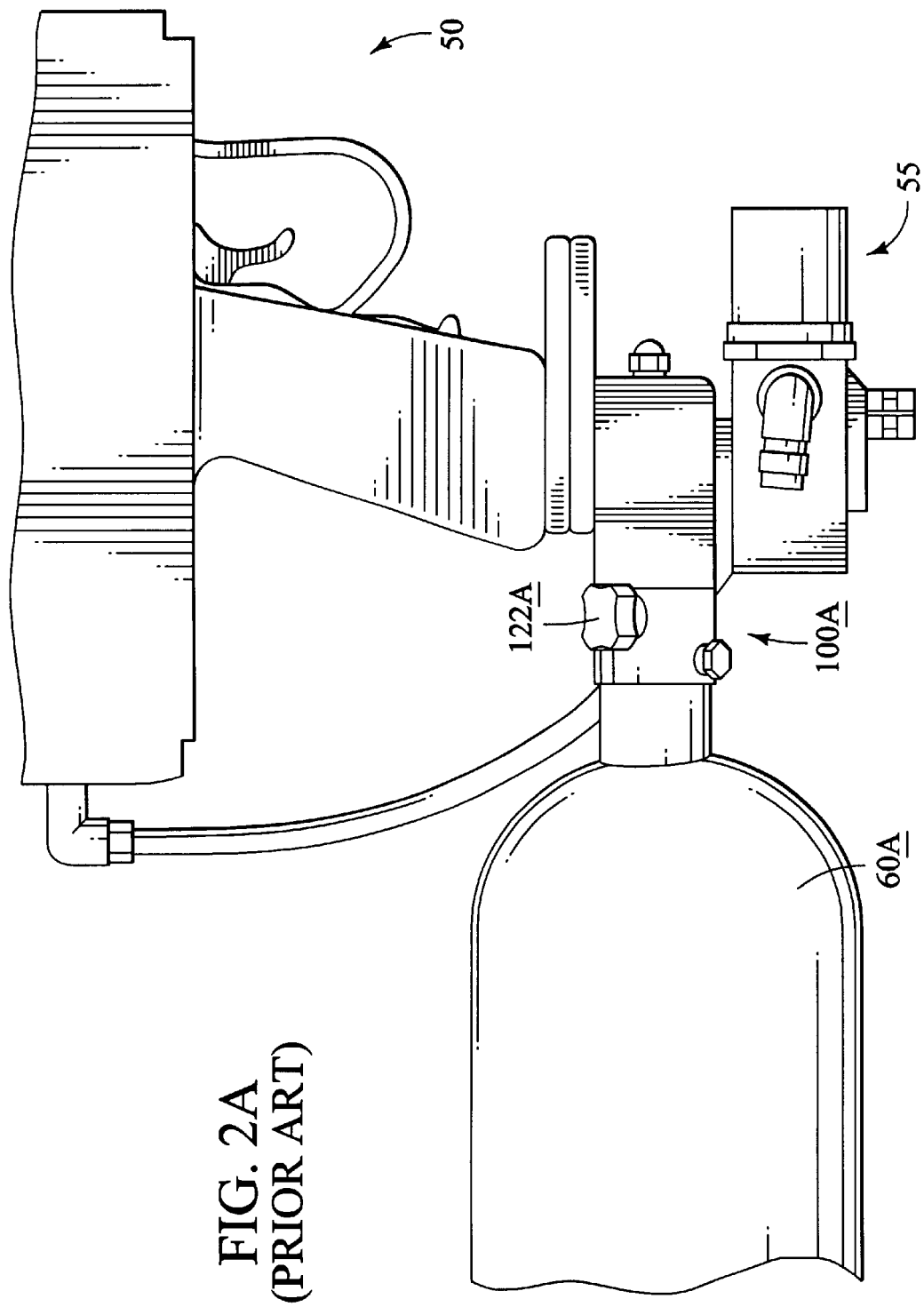
FIG. 2A is a side view of an on/off valve for a paintball gun, similar to FIG. 2, according to another configuration of the prior art.
Figure 3:
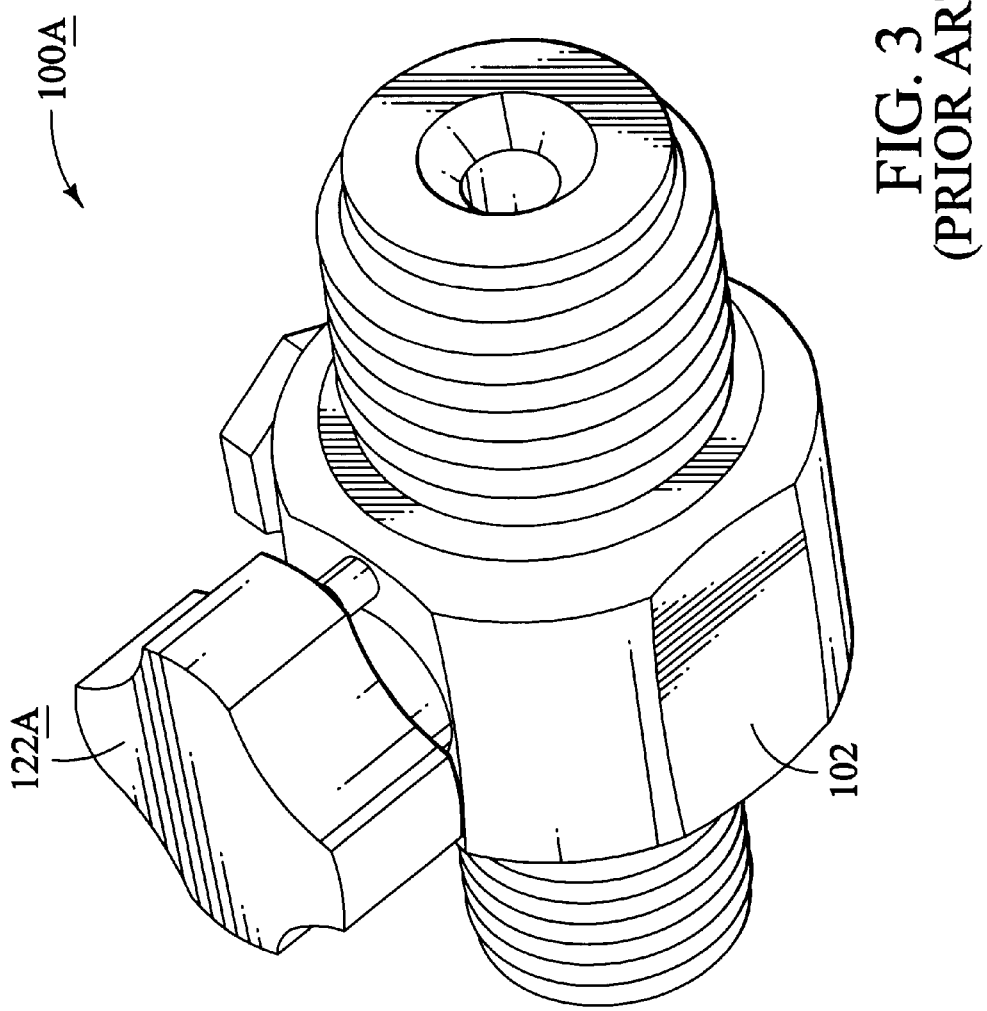
FIG. 3 is a bottom, right side perspective view of the prior art on/off valve for a paintball gun shown in FIG. 2A.
Figure 4:
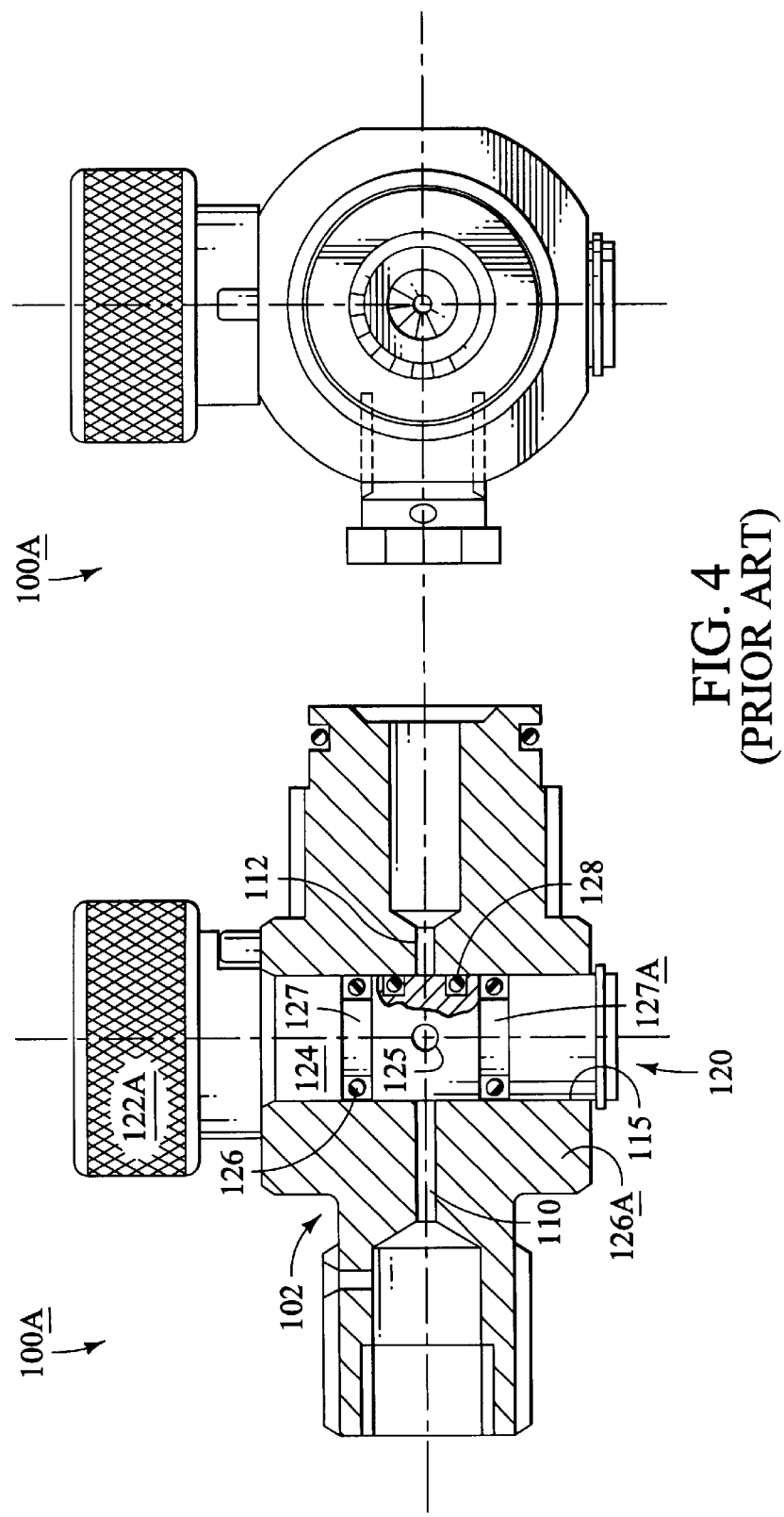
FIG. 4 is a horizontally cross-sectioned bottom plan view of the prior art on/off valve of FIG. 3, with a cutaway view of an o-ring configuration and a front elevation view.
Figure 5:
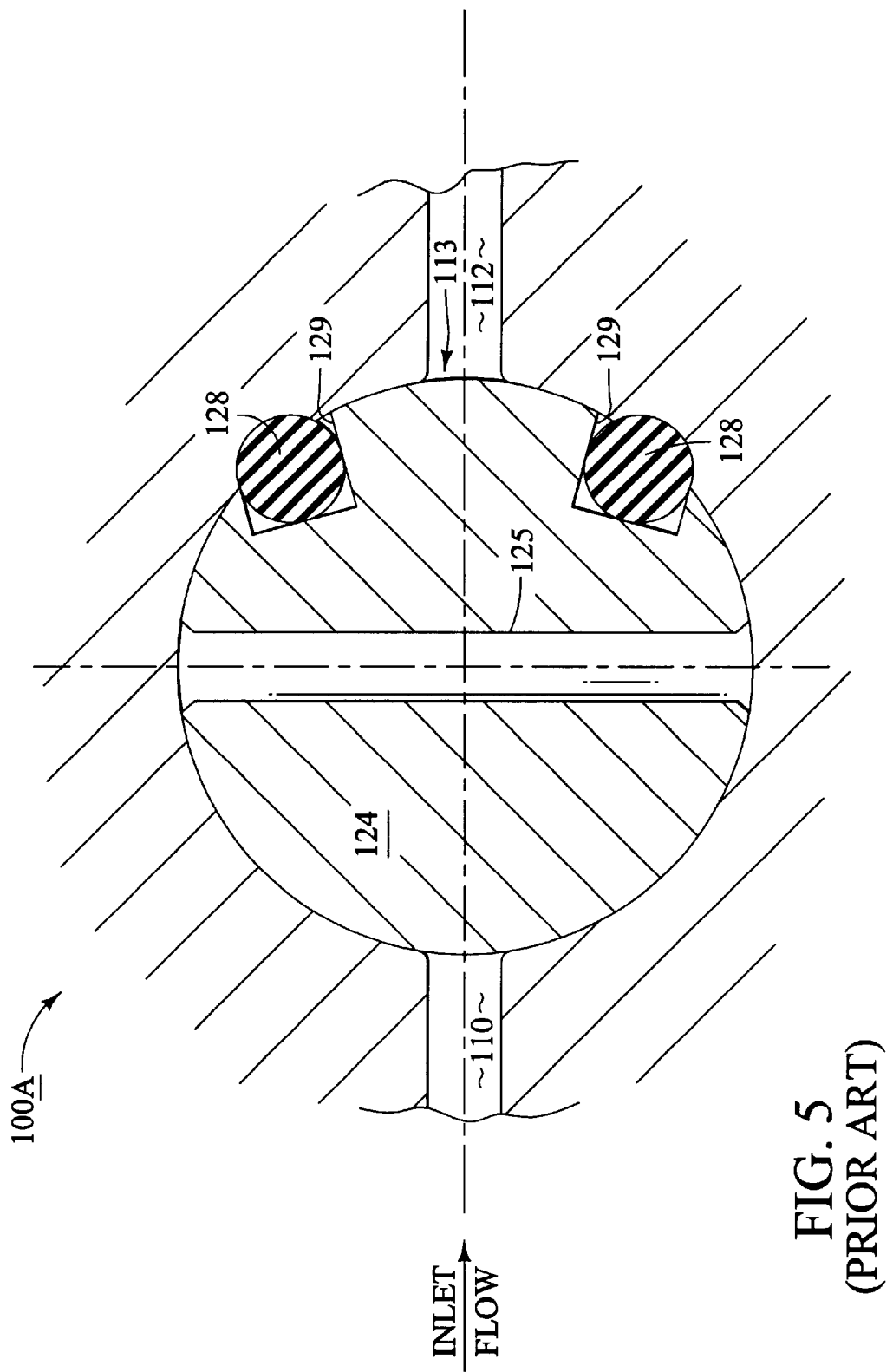
FIG. 5 is a vertically cross-sectioned enlarged right side elevation view of a section of the prior art on/off valve of FIG. 3.
Figure 6:
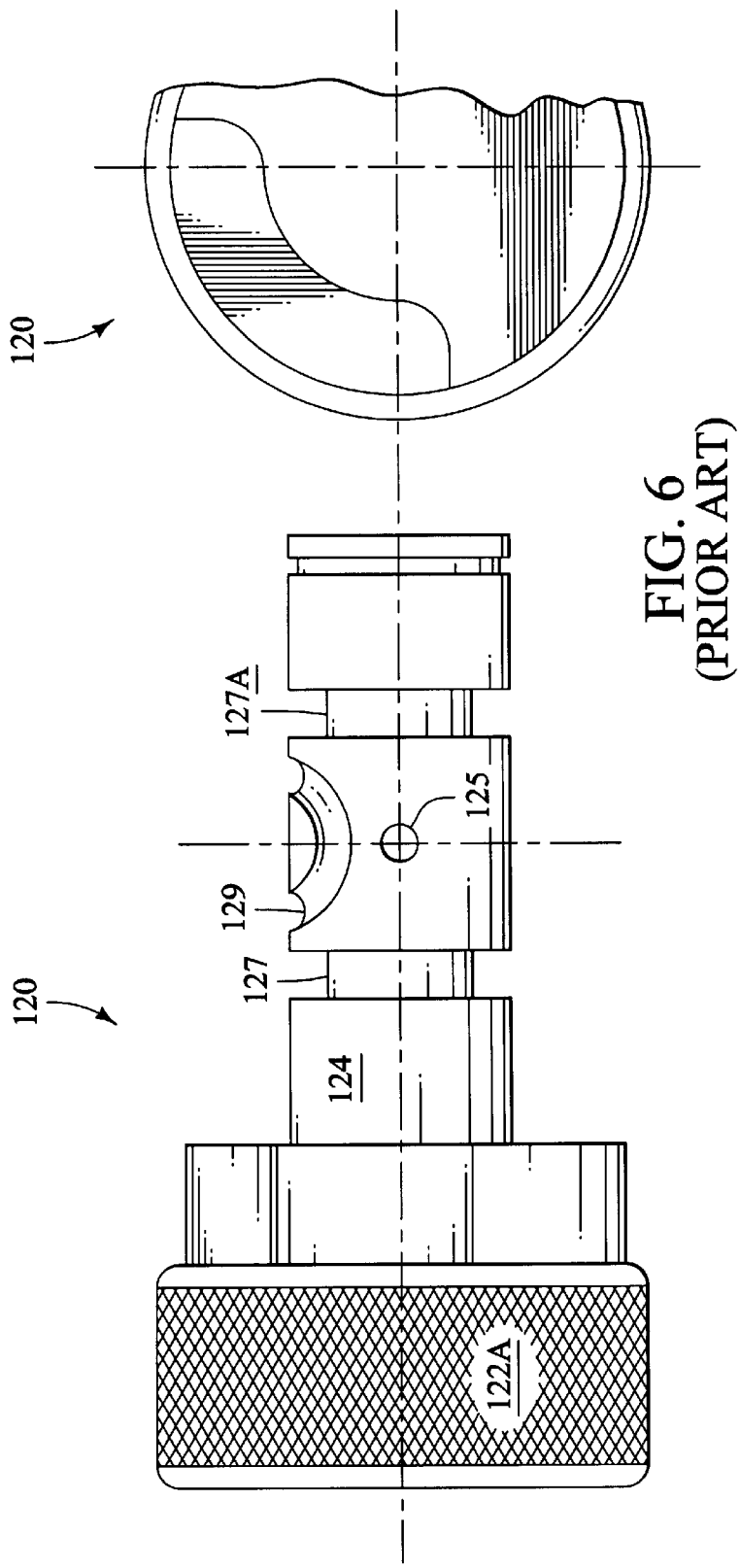
FIG. 6 is an enlarged front elevation view and a cutaway left side elevation view of a plug for use in the prior art on/off valve of FIG. 3.
Figure 7:
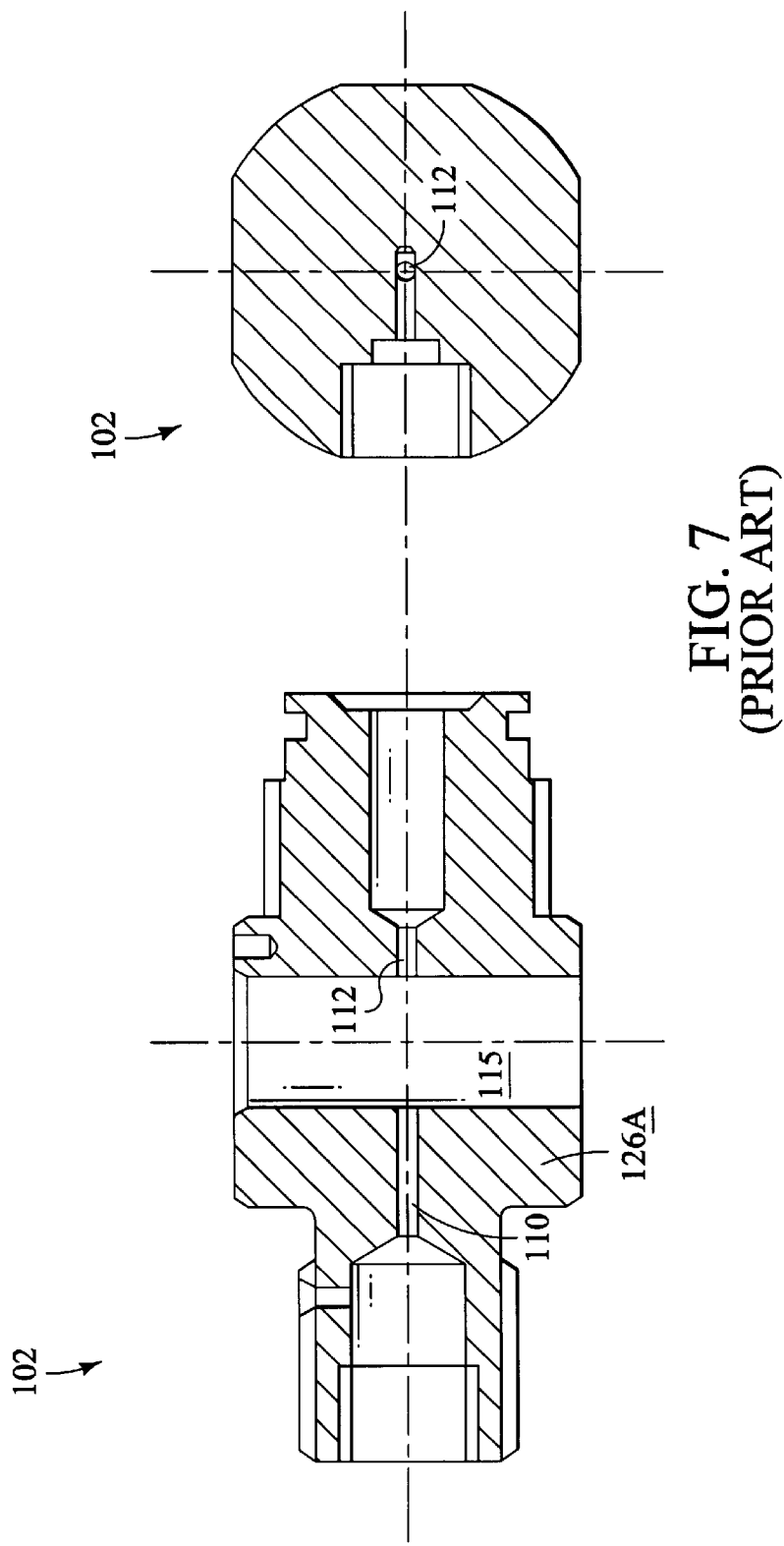
FIG. 7 is a horizontally cross-sectioned bottom plan view and a vertically cross-sectioned front elevation view of a valve body for use in the prior art on/off valve of FIG. 3.
Figure 8:
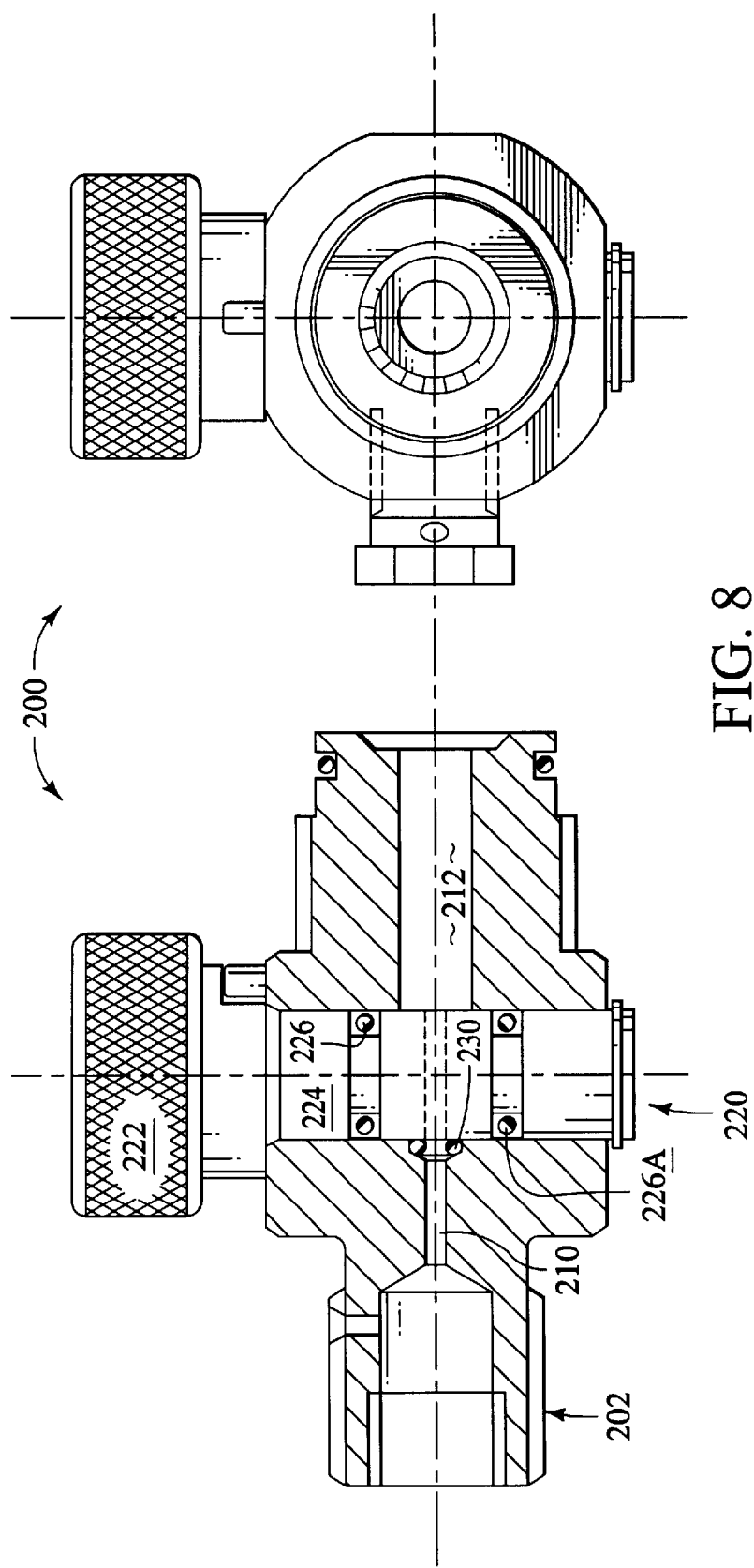
FIG. 8 is a horizontally cross-sectioned bottom plan view and a front elevation view of an on/off valve for a paintball gun according to a preferred embodiment of this invention.
Figure 9:
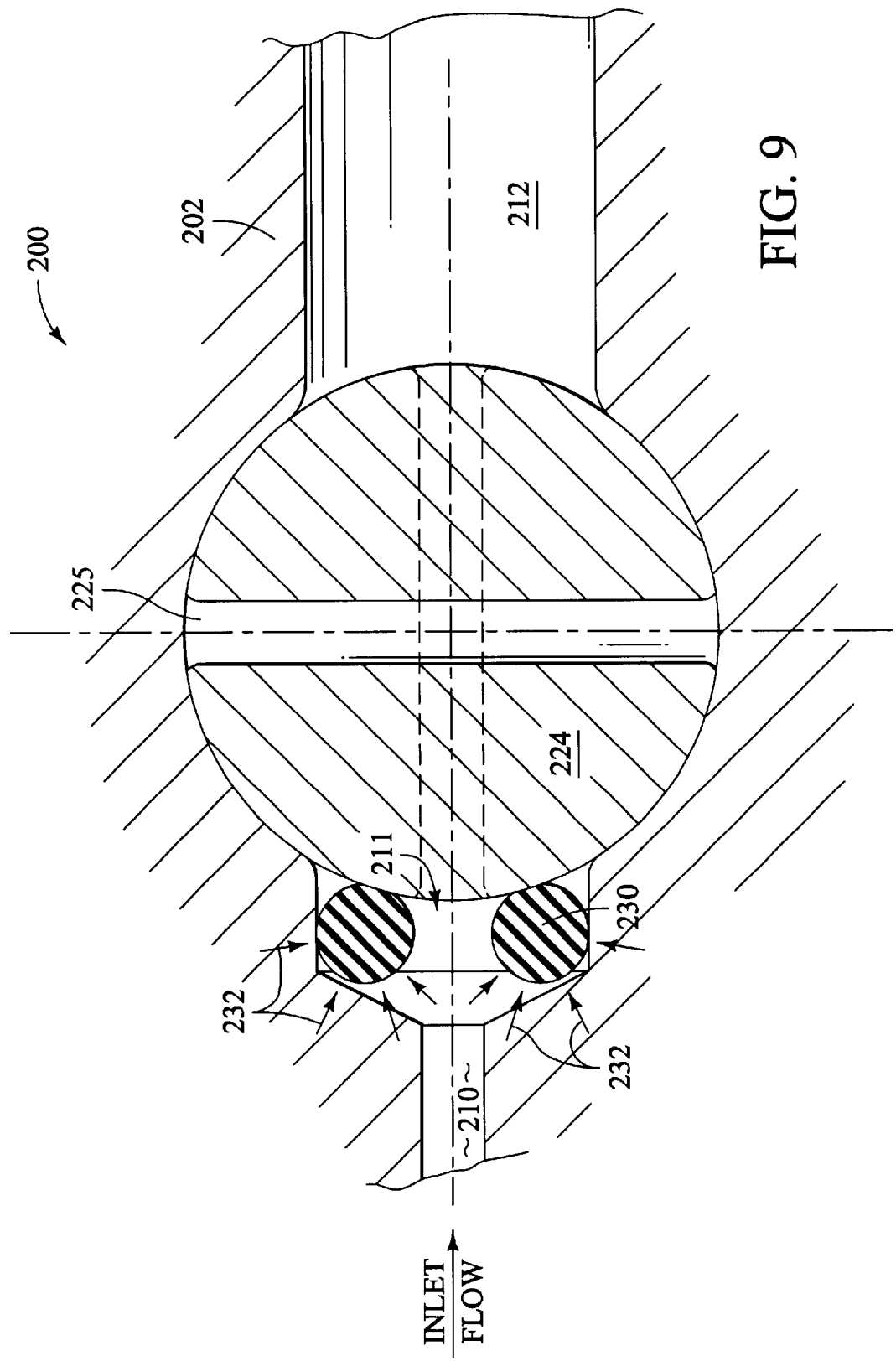
FIG. 9 is a vertically cross-sectioned enlarged right side elevation view of a section of the on/off valve for a paintball gun of FIG. 8.
Figure 10:
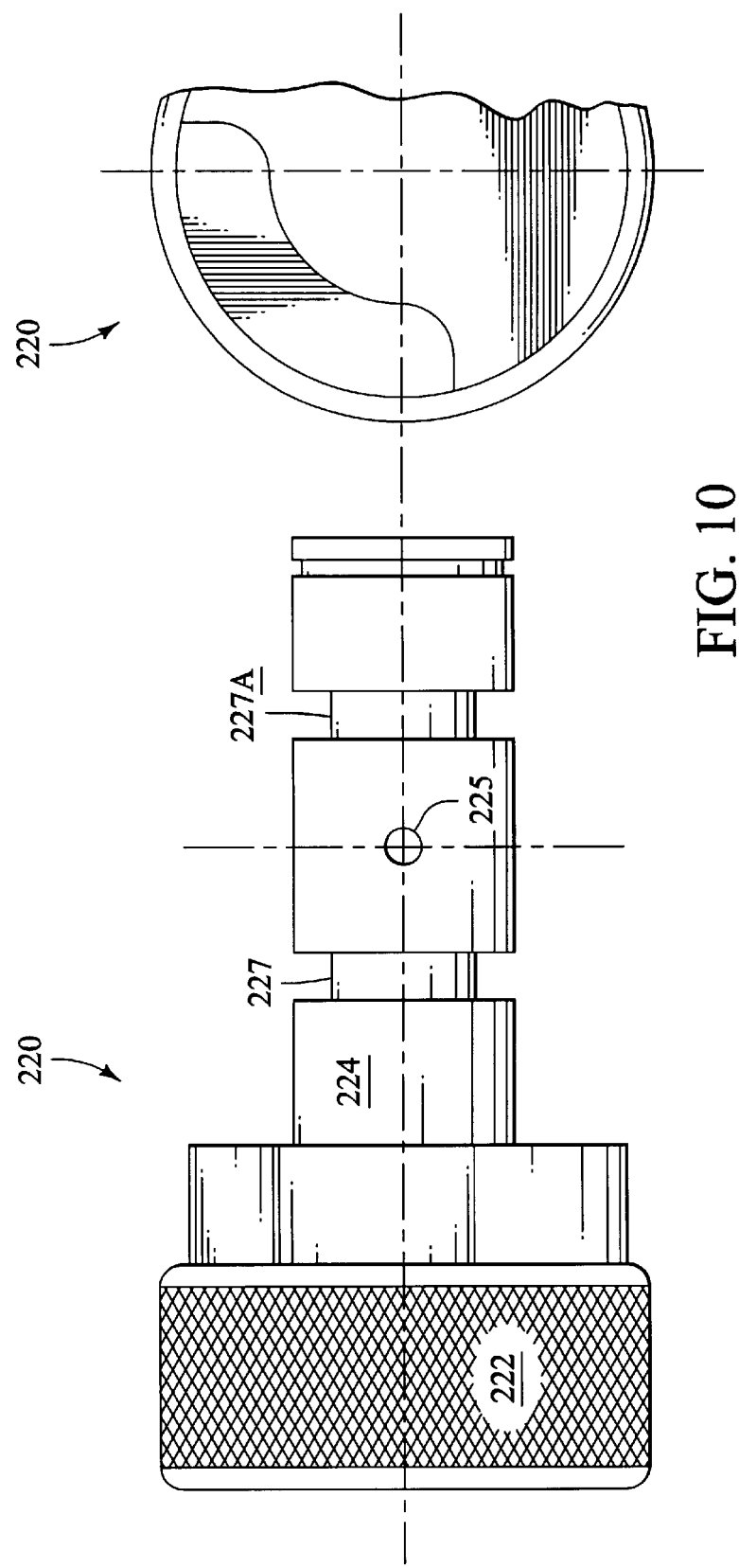
FIG. 10 is an enlarged front elevation view and a cutaway left side elevation view of a plug for use in the on/off valve of FIG. 8.
Figure 11:
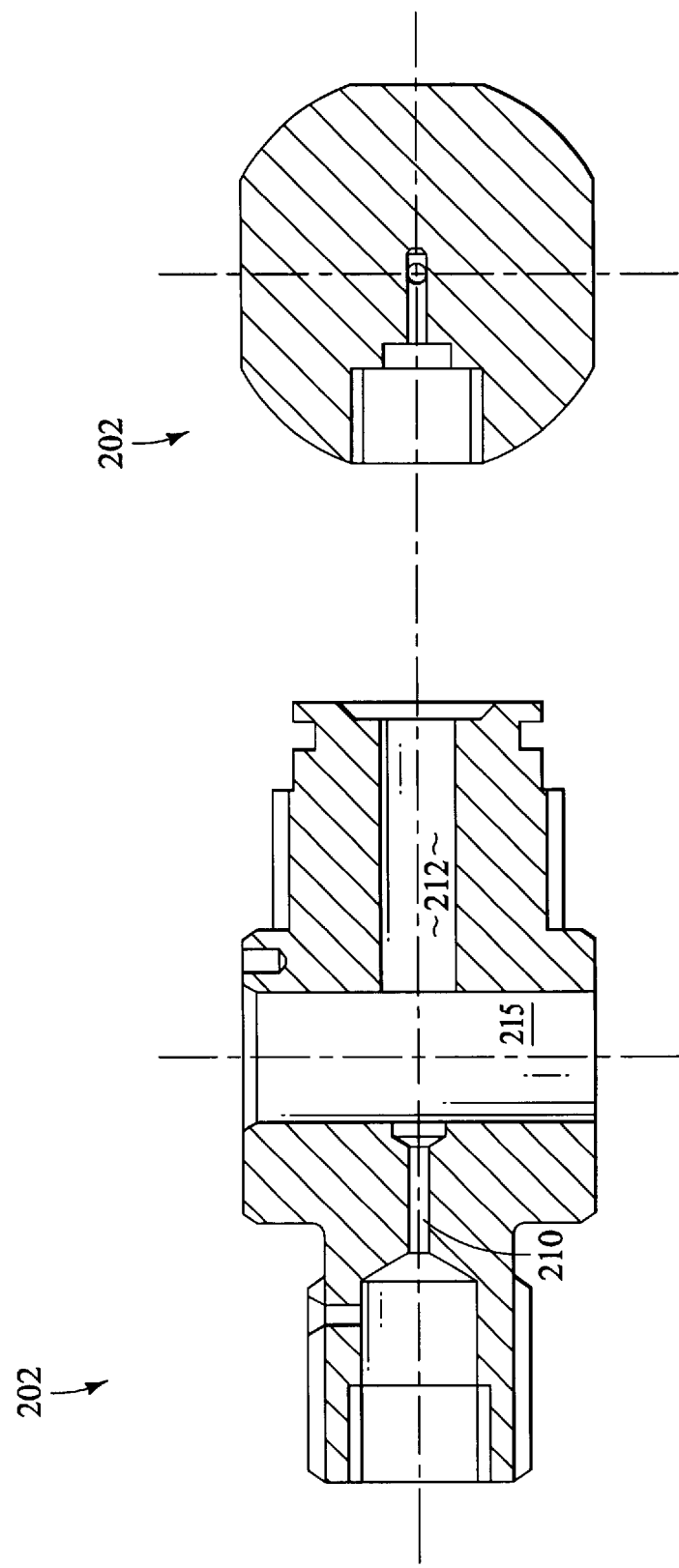
FIG. 11 is a horizontally cross-sectioned bottom plan view and a vertically cross-sectioned front elevation view of a valve body for use in the on/off valve of FIG. 8.

Although the external appearance of a preferred on/off valve of this invention is essentially the same as the external appearance of the prior art valve, the internal configuration of on/off valves made according to the principles of this invention offers significantly improved sealing properties. The internal configuration of an on/off valve according to a preferred embodiment of this invention is shown in FIGS. 8–11, which are similar to FIGS. 4–7 of the prior art. Specifically, FIG. 8 includes a horizontally cross-sectioned bottom plan view of an on/off switch 200 according to the preferred embodiment of this invention. FIG. 9 is a vertically cross-sectioned, enlarged right side elevation view of a section of the preferred on/off valve 200 of FIG. 8. FIG. 10 includes an enlarged front elevation view and a cutaway left side elevation view of a plug 220 for use in the on/off valve 200 of FIG. 8. Finally, FIG. 11 includes a horizontally cross-sectioned bottom plan view and a vertically cross-sectioned front elevation view of a valve body 202 for use in the on/off valve 200 of FIG. 8.

As can be seen from a comparison of FIGS. 4–7 and FIGS. 8–11, the on/off valve 200 according to the preferred embodiment of this invention is similar to the prior art on/off valves 100, 100A in many respects. Accordingly, the components of the preferred valve 200 of this invention corresponding to components in the prior art valves 100, 1OOA are described herein with like reference numerals, incremented by 100.

The specific configuration of the on/off valve 200 according to the preferred embodiment of this invention will now be explained in detail, with reference to FIGS. 8–11. The preferred on/off valve 200 for a paintball gun has a valve body 202 with gas apertures including a gas inlet 210 and a gas outlet 212, each extending longitudinally through the body 202. The valve body 202 further includes a plug cavity 215, extending laterally through the body 202 between the inlet 210 and the outlet 212. A plug 220 is positioned within the plug cavity 215. An actuator (such as a knob, lever, or other actuator) 22 is provided on an external portion of the plug 220. Here, the actuator 222 is a knob that is physically attached to a plug stem 224. The plug stem 224 extends into and through the plug cavity 215 from the right side to the left side of the valve body 202. A flow aperture 225 is provided through the plug stem 224 at the lateral position of the inlet 210 and the outlet 212. The actuator 222 can be rotated 90° to tun the valve 200 on or off.

Two o-rings 226, 226A extend around the plug stem 224 within grooves 227, 227A on opposite lateral sides of the inlet 210 and outlet 212. The o-rings 226, 226A prevent the gas from leaking out through the plug ends and ensure that the gas from the gas inlet 210 travels to the gas outlet 212 when the valve 200 is open. They also provide redundancy and dust protection. The operation of the valve 200 is also similar to the prior art. Specifically, when the actuator 222 is located in an "on", position, the flow aperture 225 is arranged in communication with both the inlet 210 and the outlet 212 in order to permit a flow of the gas from the inlet 210 to the outlet 212.

The key to this invention is the use of a body o-ring 230 provided within the valve body 202, rather than along the external surface of plug stem 224. Specifically, the body o-ring 230 is located inside either an exit port 211 of the gas inlet 210 or in an entry port 213 of the gas outlet 212. In the preferred embodiment shown in FIGS. 8–11, the body o-ring 230 is located in the exit port 211 of the inlet 210. The body bring 230 provides a seal between the valve body 202 and the plug stem 224, and prevents gas from leaking out of the inlet 210. Significantly, because the o-ring surrounds the inlet 210 of the valve body, it helps prevent gas leakage regardless of the position of the actuator 222. It performs its sealing function when the actuator is the "on" position (open valve) as well as when it is in the "off" position (closed valve).

Even more important, however, this configuration prevents the body o-ring 230 from moving relative to the valve body 202 and thereby substantially eliminates the risk of the body o-ring 230 being cut or damaged by burs in the body 202. This is particularly advantageous because it is easier to machine the plug stem 224 to remove burs than to remove burs from the surface of the plug cavity 215. Accordingly, movement of the finely-machined plug stem 224 in relation to the body o-ring 230 is much less likely to damage the o-ring 230 than the movement of the plug o-ring 128 in relation to the body 102, as in the prior art (see FIG. 4).

The body o-ring 230 will therefore have a significantly longer life than the prior art plug o-ring 128 and provide a more reliable on/off valve 200.

In operation, the valve 200 is switched between an open ("on") position and a closed ("off") position through 90° rotation of the plug 224 via the actuator 220. In an open position, the flow aperture 225 is arranged in communication with the inlet 210 and permits a flow of gas from the inlet 210 to the outlet 220. In a closed position, the communication between the flow aperture 225 and the inlet 220 is severed because the flow aperture 225 is then positioned transverse to the longitudinal axes of the inlet 210 and outlet 220. The body o-ring 230 provides a seal between the valve body 202 and the plug 220 when the valve is in either the open or the closed position. In the open position, the seal ensures the gas will travel through the flow aperture 225. In a closed position, the seal retains the gas within the inlet 210.

Of additional importance to this invention, gas pressure from the pressurized gas source 60 enhances the sealing properties of the body o-ring 230 by encouraging the o-ring 230 into physical communication with the plug 220. Pressure arrows 232 in FIG. 9 illustrate how the gas pressure helps maintain the body o-ring 230 in a sealing position. As gas travels to the exit port 211 of the inlet 210 it comes into contact with the body o-ring 230 and pushes it outward toward the plug stem 224. This arrangement therefore provides enhanced sealing properties over the prior art Also, significantly, because the o-ring 230 is located in the valve body 202, rather than along the surface of the plug stem 224, rotation of the plug 220 does not substantially move the o-ring 230 in relation to the valve body 202. Accordingly, the only movement of consequence for the body o-ring 230 is the movement of plug stem 224 across the o-ring 230. Again, because the plug stem 224 can be machined with greater precision than the plug cavity 215, this arrangement substantially prevents the o-ring 230 from being destroyed or damaged by burs in the body 202.

Additional properties which aid in providing a more reliable on/off valve 200 include 25 the sizing and hardness of the body o-ring 230. The body o-ring 230, for instance, is preferably made of a high density material, such as approximately Urethane of 90° shore hardness. The preferred o-ring 230 is also relatively small, such as approximately a size 003 o-ring. Unlike the large, pliable o-ring 128 of the prior art, a small, hard o-ring will not expand significantly as a result of the presence of $CO_2$. The body o-ring 230 therefore retains its circular shape.

Additional o-rings 226, 226A provide additional sealing, redundancy, and dust protection. Specifically, plug o-rings 226, 226A prevent dust or other foreign substances from entering the valve assembly around the plug and provide redundancy by preventing leaks when the inlet o-ring 230 becomes worn or damaged. They also prevented age from the outlet 220 through the plug ends.

As can be seen from the foregoing discussion, this invention provides a significant improvement in the art by enabling a more reliable on/off valve for a paintball gun. It should be noted that the key to providing the increased reliability of this invention is the positioning of a seal (such as an o-ring) within a port inside the body of the valve rather than within a recess along the plug stem. Several additional features, however, can be used to help provide the advantages of this invention. For instance, the sizing and hardness of the o-ring are also important considerations. The specifics regarding actuation of the valve, the precise configuration of the valve body and the plug, and other details of the preferred embodiment, however, are not generally important to this invention. This invention is therefore not limited to the preferred embodiment described above.

Figure 12:
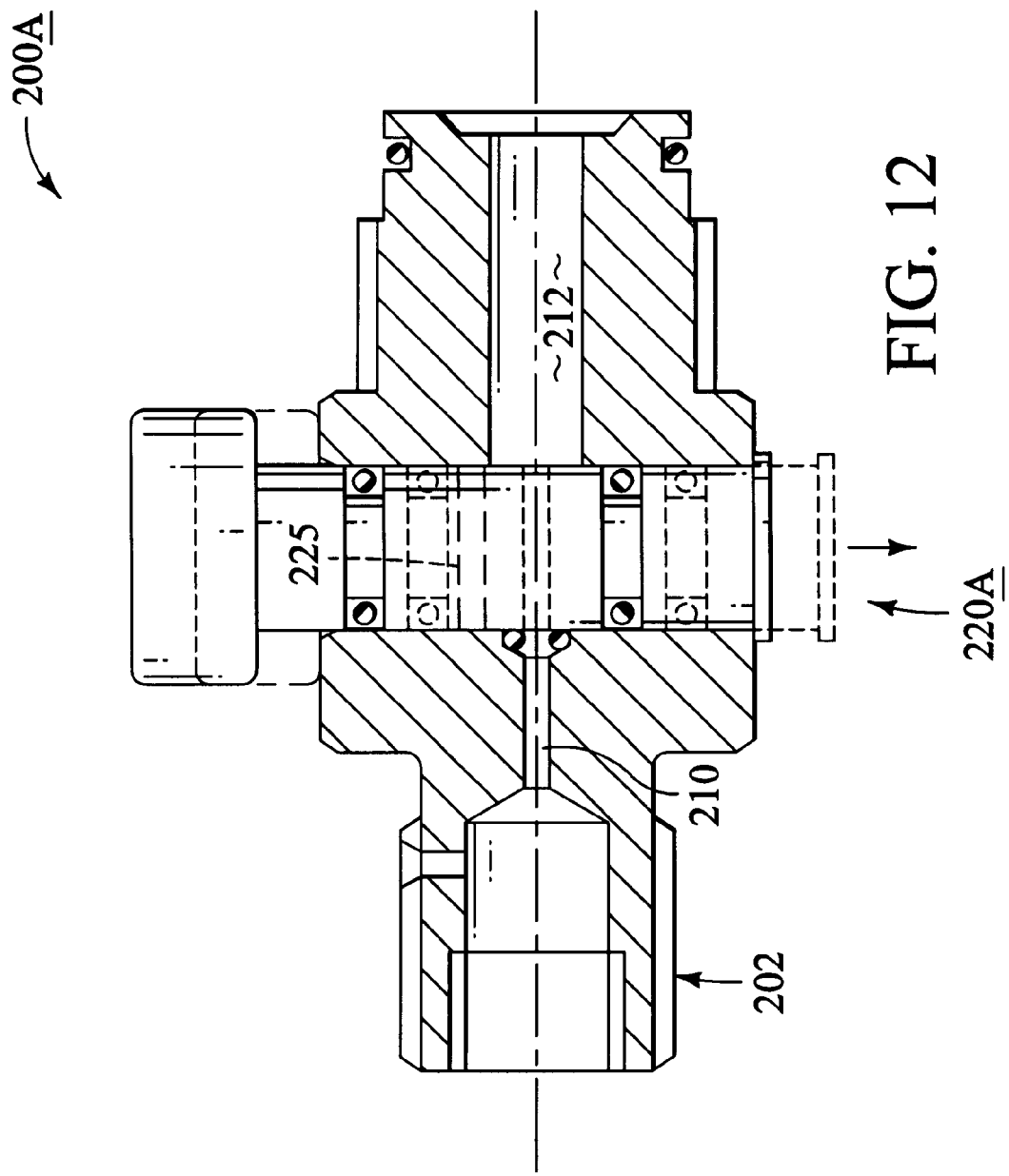
FIG. 12 is a horizontally cross-sectioned bottom plan view of an on/off valve according to a second embodiment of the present invention.

It addition to the preferred embodiment of the invention that was previously described, other specific alternative embodiments are also contemplated. In a second, alternative embodiment 200A, for instance, as shown somewhat schematically in FIG. 12, the flow aperture 225 can be moved into, and out of, fluid communication with the inlet 210 and outlet 220 by pushing or pulling the plug 220A, rather than by rotation, as with the plug 220. A guide pin can be provided to prevent rotation of the plug stem 224 and maintain the flow aperture 225 in a proper relationship with the inlet 210 and the outlet 212. It should be apparent that other means of actuation are also within the level of ordinary skill in the art, and do not depart from the scope of this invention.

Figure 13:
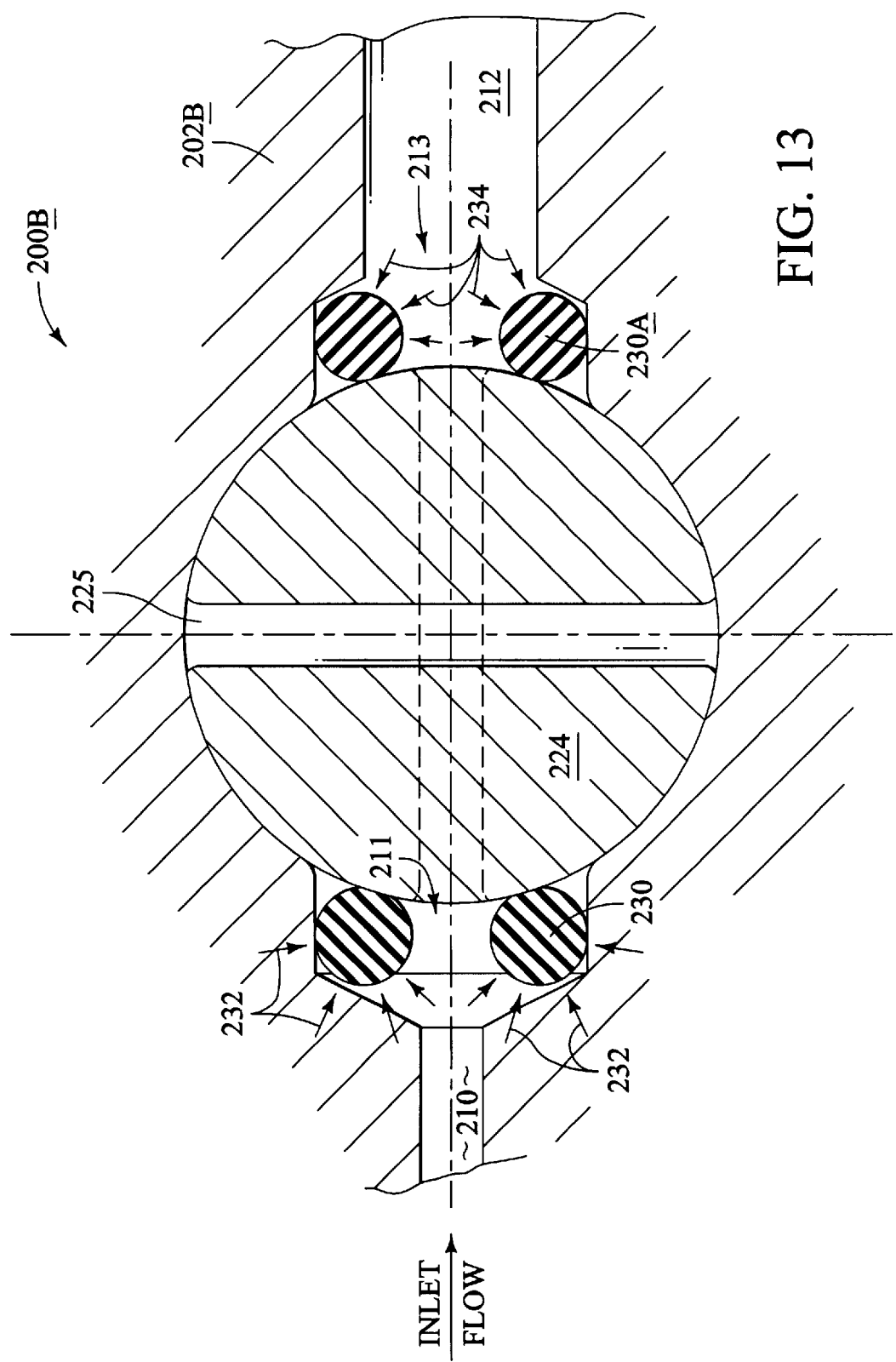
FIG. 13 is a vertically cross-sectioned right side elevation view of an on/off valve according to a third embodiment of the present invention.

A third embodiment 200B, also within the contemplation of this invention, includes locating a body o-ring 230A within an entry port 213 to the gas outlet 212, as schematically illustrated in FIG. 13. This o-ring 230A can be provided in addition to, or instead of, the body o-ring 230 located in the exit port 211 of the gas inlet 210. If sized and configured correctly, locating an o-ring 230A in the entry port 213 of the outlet 212 can provide many of the same benefits as locating the o-ring 230 within the exit port 211 of the inlet 210. If the flow aperture 225 in the plug 224 is made smaller than the outlet 212, the gas pressure (represented by pressure arrows 224) coming from the flow aperture 225 will tend to expand outward from the exit of the flow aperture 225 and force the o-ring 230A into a good sealing contact between the plug 224 and the valve body 202B. Some problems with this embodiment, however, include the difficulty of machining an o-ring retention area in the entry port 213 of the outlet 212, and the corresponding increase in expense. The body 202B could be formed in two halves and then secured together to reduce the complexity of the required machining, but the body 202B would then be bulkier and still more expensive than the preferred embodiment.

In other contemplated embodiments, the flow aperture need not be a hole through the center of the plug. The flow aperture, for instance, could be a groove around the outside of the plug, or any other type of aperture which would selectively allow gas to flow between the inlet and the outlet based on actuation of the valve.

Having described and illustrated the principles of the invention in a preferred embodiment and various alternative embodiments thereof, it should be apparent that the invention can be modified in arrangement and detail without departing from such principles. We claim all modifications and variations coming within the spirit and scope of the following claims:

What is claimed is:

1. An on/off valve for a paintball gun, comprising:
    a valve body comprising a plurality of gas apertures, said gas apertures comprising a gas inlet configured to receive a gas from a pressurized gas source, and a gas outlet configured to transmit the gas to a paintball gun;
    an actuator configured to selectively control a flow of the gas from the gas inlet to the gas outlet; and
    a seal engagingly received by the valve body and surrounding one or more of the apertures to prevent the gas from leaking.

2. An on/off valve for a paintball gun according to claim 1, further comprising:
    a plug cavity located within the valve body between the gas inlet and the gas outlet;
    a plug located within the plug cavity, the plug comprising a flow aperture; and
    wherein the gas is selectively configured to flow or to not flow through the flow aperture based on a position of the actuator.

3. An on/off valve for a paintball gun according to claim 2, wherein the seal comprises an o-ring mounted within an exit port of the inlet aperture, and wherein the o-ring is arranged in physical communication with the valve body and the plug along a periphery of the o-ring to form the seal.

4. An on/off valve for a paintball gun according to claim 3, wherein the o-ring is configured and located such that the gas from the pressurized gas source helps to maintain the o-ring in a sealing relationship with the plug.

5. An on/off valve for a paintball gun according to claim 3, wherein the o-ring is approximately a size 003 o-ring.

6. An on/off valve for a paintball gun according to claim 3, wherein the o-ring is approximately 90° shore hard.

7. An on/off valve for a paintball gun according to claim 2, wherein the flow aperture is arranged in fluid communication with the gas inlet and the gas outlet and wherein the seal is configured to ensure that the gas from the compressed source enters the flow aperture when the actuator is in an "on" position.

8. An on/off valve for a paintball gun according to claim 2, wherein the flow aperture is prevented from communicating with the gas inlet and wherein the seal is configured to ensure that the gas from the compressed source does not enter the gas outlet when the actuator is in an "off" position.

9. An on/off valve for a paintball gun according to claim 2, wherein the seal comprises an o-ring mounted within an entry port of the outlet aperture, and wherein the o-ring is arranged in physical communication with the valve body and the plug along a periphery of the o-ring to form the seal.

10. A method for manufacturing an on/off valve for a paintball gun, comprising:
    providing a valve body having a gas inlet configured to receive a gas from a pressurized gas source and a gas outlet configured to deliver the gas to a paintball gun;
    configuring an on/off switch to selectively supply the gas from the gas inlet to the gas outlet; and
    providing a seal within a seal receptacle formed in the valve body around either the gas inlet or the gas outlet to prevent leakage of the pressurized gas through the outlet when the on/off switch is in an "off" position.

11. A method of manufacture according to claim 10, wherein providing an on/off switch to selectively supply pressurized gas from a pressurized gas source from the gas inlet to the gas outlet further comprises:
    configuring a plug with a flow aperture to provide a flow path between gas inlet and the gas outlet when the valve is in an open position; configuring the plug and the seal to sever the flow path to the gas outlet when the valve is in a closed position.

12. A method of manufacture according to claim 10, wherein providing a seal within a seal receptacle comprises providing an o-ring in an exit port of the gas inlet.

13. A method of manufacture according to claim 11, wherein providing a seal comprises providing an o-ring in an exit port of the gas inlet in physical communication with the valve body and the plug.

14. A method according to claim 13, wherein the o-ring is approximately a size 003 o-ring and has an approximately 90° shore hardness.

15. An on/off valve for a paintball gun, comprising:
    a valve body comprising a gas inlet configured to receive a gas from a compressed gas source, a gas outlet configured to supply the gas to a paintball gun, and a plug cavity;
    a plug located within the plug cavity, said plug having a flow aperture;
    an actuator for selectively controlling fluid communication between the gas inlet and the gas outlet through the flow aperture, said plug moving responsive to actuator movement; and
    an o-ring located within a port in the valve body to prevent leakage of the pressurized gas from the exit port when the actuator is in an "off" position.

16. An on/off valve for a paintball gun, according to claim 15, wherein the flow aperture is arranged to permit a flow of the gas from the inlet to the outlet when the actuator is in an "on" position and arranged to prevent the flow of the gas from the inlet to the outlet when the actuator is in an "off" position.

17. An on/off valve for a paintball gun, according to claim 15, wherein the o-ring is located within an exit port of the gas inlet.

18. An on/off valve for a paintball gun, according to claim 15, wherein the o-ring is located within an entry port of the gas outlet.

19. An on/off valve for a paintball gun according to claim 15, wherein the o-ring has a hardness of approximately 90° shore.

20. An on/off valve for a paintball gun, according to claim 15, wherein the o-ring is approximately size 003.

* * * * *

UNITED STATES PATENT AND TRADEMARK OFFICE
CERTIFICATE OF CORRECTION

PATENT NO. : 6,260,821 B1
DATED : July 17, 2001
INVENTOR(S) : Rod Perry and William Gardner, Jr.

It is certified that error appears in the above-identified patent and that said Letters Patent is hereby corrected as shown below:

<u>Title page,</u>
Item [57], ABSTRACT,
Line 4, "gun The" should be -- gun. The --.
Line 13, " "oi" position" should be -- "on" position --.

<u>Column 3,</u>
Line 21, "outlet Finally" should be -- outlet. Finally --.
Line 30, "DESCRIRIPON" should be -- DESCRIPTION --.

<u>Column 4,</u>
Line 7, "DESCRITION" should be -- DESCRIPTION --.
Line 62, " "on", position," should be -- "on" position --.

<u>Column 6,</u>
Line 11, "prevented age" should be -- prevented leakage --.

Signed and Sealed this

Twenty-sixth Day of November, 2002

*Attest:*

*Attesting Officer*

JAMES E. ROGAN
*Director of the United States Patent and Trademark Office*